Figure 1:
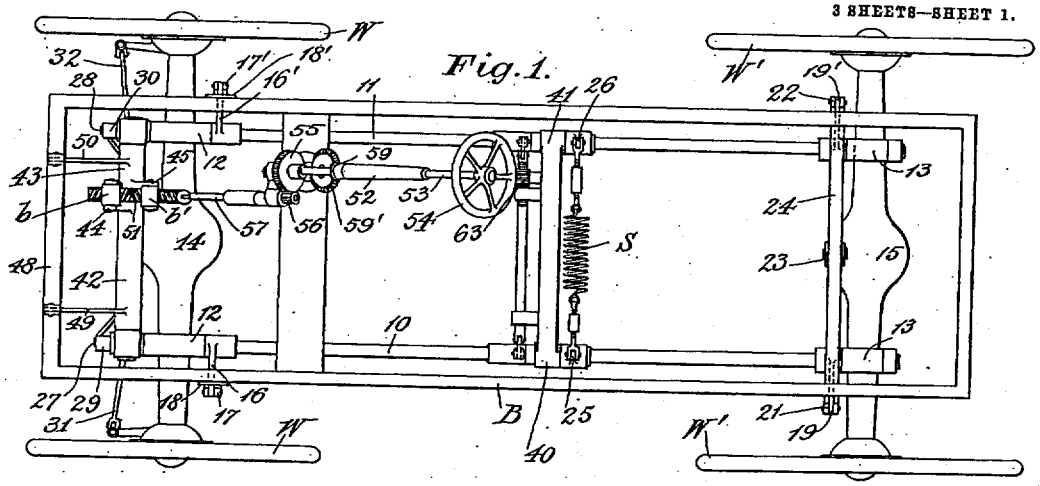

C. F. SCHMELZ.
VEHICLE.
APPLICATION FILED MAR. 30, 1906.

932,333.

Patented Aug. 24, 1909.
3 SHEETS—SHEET 1.

WITNESSES:
J. W. Bryce
B. F. Funk

INVENTOR.
Charles F. Schmelz,
BY Gales P. Moore
HIS ATTORNEY.

C. F. SCHMELZ.
VEHICLE.
APPLICATION FILED MAR. 30, 1906.
932,333.
Patented Aug. 24, 1909.
3 SHEETS—SHEET 2.
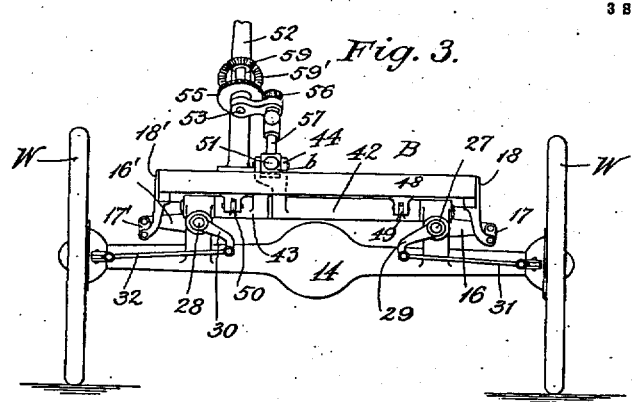
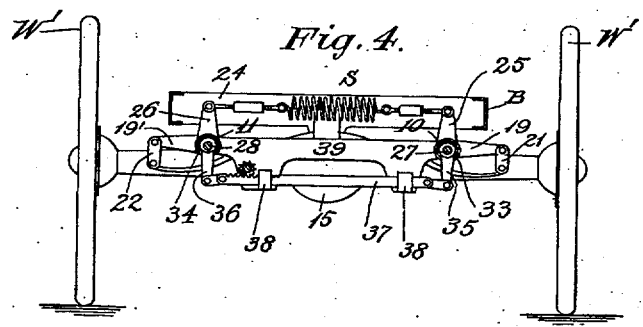
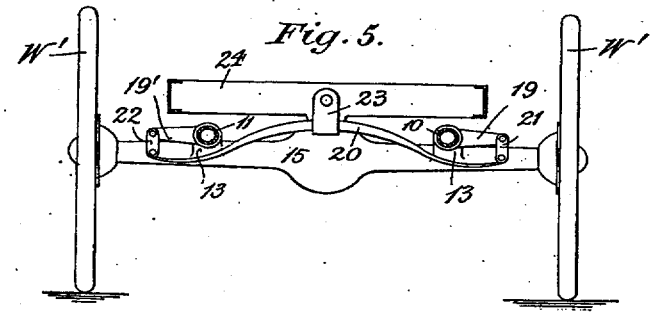
WITNESSES:
J. W. Bryce.
D. F. Funk.
INVENTOR.
Charles F. Schmelz,
BY Gales P. Moore
his ATTORNEY.

C. F. SCHMELZ.
VEHICLE.
APPLICATION FILED MAR. 30, 1906.

932,333.

Patented Aug. 24, 1909.
3 SHEETS—SHEET 3.

WITNESSES:
J. W. Bryce.
B. F. Funk.

INVENTOR.
Charles F. Schmelz,
BY
Gales P. Moore
his ATTORNEY.

UNITED STATES PATENT OFFICE.

CHARLES F. SCHMELZ, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

VEHICLE.

932,333.  Specification of Letters Patent.  Patented Aug. 24, 1909.

Application filed March 30, 1906. Serial No. 308,890.

*To all whom it may concern:*

Be it known that I, CHARLES F. SCHMELZ, a citizen of the United States, residing at Bristol, county of Hartford, State of Connecticut, have invented a certain new and useful Vehicle, of which the following is a full, clear, and exact description, such as will enable others skilled in the art to which it appertains to make and use the same, reference being had to the accompanying drawings, forming part of this specification.

This invention relates to the general classes of vehicles, but particularly to motor vehicles or similar devices calculated to be moved at a relatively high rate of speed and carrying a body member.

In order to illustrate the application of my invention, I have shown it as applied to a motor vehicle minus the driving mechanism and other well known accessories because these might easily be omitted as they form no part of the present invention and would tend to obscure the mechanism which it is desired to illustrate.

One of the disadvantages heretofore experienced by occupants of motor vehicles has been the uncomfortable effect produced in scribing an arc, as for example, in turning a corner. This has been due in a measure to the centrifugal force resulting from causing the wheels to run on an arc of a circle, the tendency being to throw the load toward the outer side of the vehicle.

It is the purpose of my invention to overcome this annoyance by permitting the vehicle body to tilt in proportion to the deflection of the wheels from a straight course, in other words: it is one of the objects of my invention to provide means for tilting the vehicle body when the wheels are scribing arcs, so that the highest part of the body will be on the outer side, causing the floor and seats to incline upwardly in an outer direction to resist the tendency of the load to shift.

Another object of my invention is to provide means whereby the tilt of the body may be accomplished through the steering gear.

Another object of my invention is to provide means whereby the body will be caused to maintain parallelism with the running frame during the time that the vehicle is moving in a straight course.

Another object of my invention is to provide means for resiliently supporting the vehicle body irrespective of its angle of inclination.

Other objects and advantages, as well as the novel details of construction of this invention, will be specifically set forth hereinafter, it being understood that changes in form, proportion and minor details of construction may be resorted to without departing from the spirit of the invention or sacrificing any of the advantages thereof.

Figure 2:
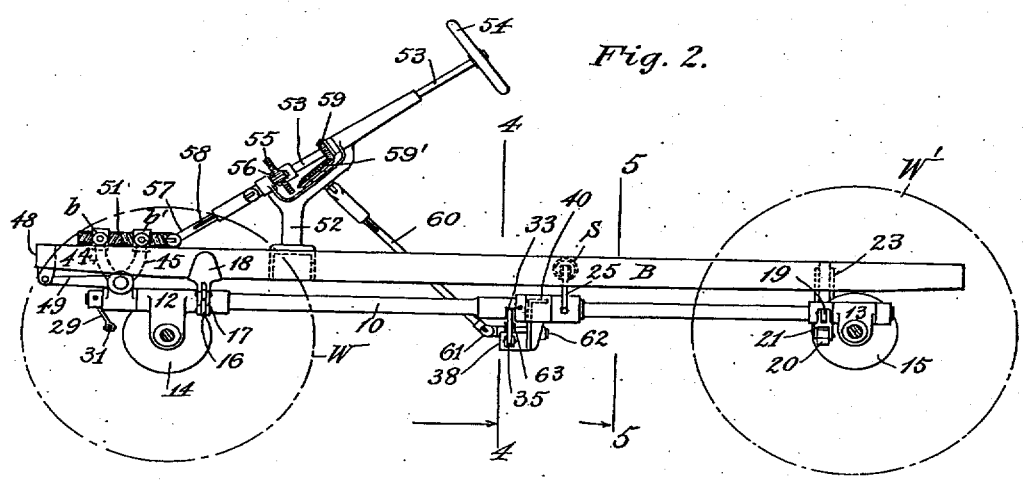
Figure 6:
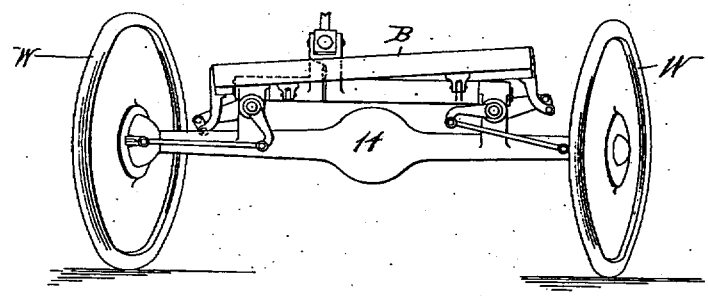
Figure 7:
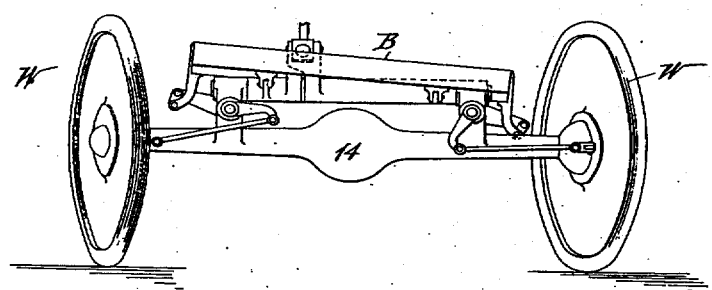

In the drawings: Figure 1 is a top view of a motor vehicle to which my invention has been applied; Fig. 2 is a side view of the same; Fig. 3 is a front end view; Fig. 4 is a sectional view on the line 4—4 of Fig. 2; Fig. 5 is a sectional view on the line 5—5 of Fig. 2; and Figs. 6 and 7 are end views showing the different inclined positions of the body frame when the wheels are deflected in different directions.

The running gear is illustrated, in the present instance, as including longitudinally disposed hollow side bars 10 and 11 mounted in bearings 12 and 13 on the respective axle casings 14 and 15, which carry the axles supported by the wheels W and W'.

B designates the body frame which is illustrated as being connected to the running gear frame through the medium of the outwardly disposed arms 16 and 16' carried by the hollow side bars 10 and 11, which side bars are adapted to rock in the bearings 12 and 13. The connection between the arms 16 and 16' and the body frame includes links 17 and 17' also connected to the brackets 18 and 18' carried by the body frame near one end thereof (in the present instance they are shown as being near the front end). Near the end distant from the arms 16 and 16' are outstanding arms 19 and 19' which are connected to a leaf spring 20 through the medium of the links 21 and 22, the intermediate portion of said spring being connected to the body as at 23, through the transverse bar 24. The upstanding arms 25 and 26 are rigidly secured to the bars 10, 11 respectively, and have interposed between them a suitable resilient connection illustrated in the present instance as comprising a convolute spring S connected to said arms, so as to have a tendency to normally bring their upper ends together, this tendency, however, being resisted by the weight of the body augmented to a considerable degree by the weight of the passengers or load on the body. The expansion and contraction of the spring due to the vibration of the load will be effectual in providing a requisite cushion.

Journaled in the hollow side bars 10 and 11 are rock shafts 27 and 28, which rock shafts are provided with rigid steering arms 29 and 30 at one end, in the present instance the front end, and these steering arms are illustrated as being connected to the front wheels by links 31 and 32. Depending from said rock shafts 28 and 29 and projecting through the arcuate slots 33 and 34 in the said bearings 10 and 11, are arms 35 and 36 which arms are rigid on the rock shafts 28 and 29, and have linked connections with a transversely disposed reciprocatory rack bar 37, which rack bar is supported in guides 38 carried by a hanger 39, which hanger also serves the purpose of preventing sidewise movement of either the bar 10 or 11 supported in bearing 40 and 41 thereof.

On the side bars 10 and 11 is a sectional, transverse shaft illustrated as comprising two parts 42 and 43 with longitudinally upstanding projections 44 and 45, which carry blocks $b$ $b'$ having alining and threaded openings. These shaft sections 42 and 43 are connected to an end bar 48 of the frame B by arms 49 and 50, said arms being rigid on the shaft sections 42 and 43 but having swinging connections with said bar 48.

When the projections 44 and 45 are in the position shown in Figs. 1 to 5, the body will be maintained in parallelism with the running gear irrespective of where the load is applied, because a screw connection 51 between said arms 44 and 45 will hold the two sections 42 and 43 rigid with each other and prevent any movement unless said screw 51 is turned. Therefore, it will follow that if weight is applied to either side of the vehicle body, one of the side bars 10 or 11 will be caused to be rocked pulling down either the arm 49 or 50 and thereby causing the other arm to become depressed, with the result that the opposite side of the vehicle body will be depressed in proportion to the amount of depression of the side having the weight, so that all parts of the frame will be depressed to the same degree. If the weight is removed, the rise of one portion of the body will cause all portions of the body to become sufficiently raised, and the maintenance of the parallelism will, therefore, be assured.

As heretofore, stated, it is one of the purposes of my invention to destroy the parallelism between the body and the running gear frame at certain periods, as for example, when the vehicle is scribing an arc. I have provided an appropriate mechanism for accomplishing this result. This mechanism in the present instance is illustrated as comprising a stand bracket 52, in which is journaled a shaft 53 carrying a hand wheel 54 whereby the operator may control the direction of rotation of the shaft. Carried by the shaft 53, is a gear 55, which meshes with a pinion 56 carried by telescopic shaft 57, which is provided with universal joints, one of which is used as a connection between said shaft 57 and the screw 51. The two sections of the telescopic shaft 57 are permitted to have longitudinal play one upon the other, but any rotative movement of one of the members with relation to the other will be prevented by a key-way and spline, the spline being illustrated at 58. A bevel pinion 59 carried by the shaft 53 is in mesh with a bevel gear 59' on a telescopic shaft 60, which is provided with a universal joint 61 providing a connection between it and a shaft 62 on which is a pinion 63, at all times in mesh with the teeth on the rack bar 37. When the operator desires to scribe an arc, as in turning a corner, the hand wheel 54 will be turned in the proper direction to impart the proper direction of movement to the shafts 53 and 57, as well as the shaft 60; the movement imparted to the shaft 60 will be communicated to the pinion 63 causing the rack bar to move either to the right or to the left and impart movement to each of the rock shafts 27 and 28; and, through the medium of the connections 31 and 32 with the wheels, said wheels will be deflected to the proper angle in the proper direction. Synchronously with this, proper movement will be imparted to the screw 51 causing the upstanding projections 44 and 45 to move either toward or away from each other, this being possible on account of the right and left hand threads on the screw 51. Now the movement of the upstanding projections toward and away from each other will be effective in tilting the body either to the right or to the left, and the mechanism so arranged that this tilting conforms to the deflection of the wheels, as shown in Figs. 6 and 7. When the wheels are deflected to the right, the left hand side of the vehicle body will be raised, and when the wheels are deflected to the left, the right hand side of the vehicle will be raised, thus the tendency to throw the load toward the outer side of the vehicle will be resisted on account of the angle of inclination of the body. As soon as the wheels are brought back in parallelism with the longitudinal center of the running gear frame, the body will be caused to resume its horizontal position and this will be destroyed only when the wheels are deflected. By reference to the drawings, it will be observed that the shaft 57 is driven at a relatively lower speed than the shaft 60, thus the range of movement of the upstanding projections 44 and 45 will be greater during a greater turn of the hand wheel 54, than will the range of movement of the rack bar 37 which imparts the tilting movement to the vehicle body.

Another feature to which I desire to call attention is that when the body is tilted the center of gravity will be changed or shifted toward the inner side of the vehicle, that is to say toward the lower side of the vehicle body; thus the tendency of the vehicle to overturn will be reduced, if not wholly eliminated. As soon as the vehicle body is permitted to assume an approximately horizontal position, the center of gravity will be shifted to about the longitudinal central portion of the vehicle.

In view of the fact that the adjusting means for controlling the tilting of the body includes a screw, it is obvious that after the parts are once set, any liability of their becoming loose except by positive operation will be avoided. The pitch of the threads on the screw 51 is such that the parts will be held in their adjusted positions irrespective of the angle of deflection of the wheels, or the angle of inclination of the body. This will be equally true when the body is held in an approximately horizontal plane.

It is to be understood that the wheels W and W' are capable of swinging on a vertical axis. However, in view of the fact that any construction which will permit this may be utilized, and in view of the fact that wheels generally pivoted to swing on vertical axes are used with motor vehicles, it is deemed unnecessary to specifically illustrate any particular form in this case.

What I claim is:

1. The combination with a base including wheels which are at all times vertical, a body adapted to be supported by said base, and means for synchronously deflecting the wheels and tilting the body.

2. The combination with a base including wheels which are capable of being deflected but which always remain in a vertical plane, of a body, a steering gear and means actuated by the steering gear for permitting the body to tilt with respect to the base when the wheels are deflected.

3. The combination with a base including wheels, of a body, a steering gear and means actuated by the steering gear for permitting the body to tilt with respect to the base and the wheels when the wheels are deflected.

4. A vehicle having a wheeled base and a body, a steering gear, and means actuated by the steering gear for changing the angle of the body with respect to the wheels and base.

5. A vehicle having a wheeled base a steering gear and a body, and means actuated by the steering gear for changing the center of gravity of the vehicle in proportion to the angle of deflection of the wheels in a horizontal plane, so that the body will tilt at an angle to the vertical axes of the wheels.

6. The combination with a wheeled base and a body, of means for maintaining parallelism between the base and the body, irrespective of the position of the applied load and positive means for temporarily destroying the parallelism when the wheels are deflected toward one side or the other, so that the body will tilt at an angle to the vertical axes of the wheels.

7. The combination with a wheeled base, of rockable elements carried by said base, a body connected to said rockable elements whereby parallelism will be maintained between the base and the body irrespective of the position of the load, and means for temporarily destroying the parallelism between the base and the body.

8. The combination with a base, of a body, connections between said base and said body for maintaining parallelism between said base and said body irrespective of the position of the load on the body, and means whereby said parallelism may be temporarily destroyed.

9. The combination with a base having steering wheels, of a body, connections between said base and said body for normally maintaining parallelism between the base and the body irrespective of the position of the applied load, connections between the steering wheels and the base, and means for deflecting the steering wheels and for tilting the body.

10. The combination with a base having steering wheels, of rock shafts carried by said base, a body, connections between the body and rock shafts, a sectional rock shaft, connections between said sectional rock shaft and said body, means for changing the relative positions of the sections of said rock shaft with respect to each other, and means for deflecting the wheels.

11. The combination with a base having steering wheels, of rock shafts carried by said base and connected to the steering wheels, a rack bar connected to said rock shafts, and a steering mechanism having a pinion engaging said rack bar to rock the shafts.

12. The combination with a base having steering wheels, of rock shafts carried by said base and connected to the steering wheels, a rack bar connected to said rock shafts, a steering mechanism having a pinion engaging said rack bar to rock the shafts, a body carried by the base, and means for tilting the body when the rock shafts are moved.

13. The combination with a base having steering wheels, of a steering mechanism therefor, a body, connections between the body and the base including a sectional rock shaft having projections with threaded openings, a screw having differently pitched threads engaging said openings, and means operable through the steering mechanism to actuate the screw to change the relative positions of the rock shaft sections.

14. The combination with a base having steering wheels, of hollow longitudinal reaches forming a part of said base, a body, connections between the reaches and the body, rock shafts within the reaches, connections between the rock shafts and the wheels, a transverse sectional rock shaft carried by the base and connected to the body, upstanding projections carried by the adjacent ends of the rock shaft sections and having threaded openings, a screw in said threaded openings, and means for actuating the rock shafts and for synchronously actuating the screw.

15. The combination with a base having steering wheels, of hollow rockable reaches forming part of said base, a cushioning mechanism connected to said reaches, a body, connections between the reaches and the body, rock shafts within the reaches, connections between the rock shafts and the wheels, a transverse sectional rock shaft carried by the base and connected to the body, upstanding projections carried by the adjacent ends of the rock shaft sections and having threaded openings, a screw in said threaded openings, and means for actuating the rock shafts and for synchronously actuating the screw.

16. The combination with horizontal axles, of means for maintaining said axles in horizontal planes at all times, wheels on said axles, a body supported by the axles, and means for deflecting the wheels to turn the vehicle and for tilting the body with respect to said axles.

17. The combination with axles, of wheels connected to said axles, a tilting body supported by said axles, and means for deflecting the wheels in horizontal planes only and for tilting the body.

18. The combination with a body and axles, of wheels on said axles at all times vertical but adapted to be deflected out of a straight path, a steering gear for deflecting all said wheels, and means actuated by the steering gear for tilting the body in proportion to the deflection of the wheels.

In testimony whereof, I hereunto affix my signature, in the presence of two witnesses.

CHARLES F. SCHMELZ.

Witnesses:
B. F. FUNK,
H. W. TUTTLE.

---

It is hereby certified that in Letters Patent No. 932,333, granted August 24, 1909, upon the application of Charles F. Schmelz, of Bristol, Connecticut, for an improvement in "Vehicles," an error appears in the printed specification requiring correction, as follows: In line 103, page 3, the word "by" should be stricken out; and that the said Letters Patent should be read with this correction therein that the same may conform to the record of the case in the Patent Office.

Signed and sealed this 14th day of September, A. D., 1909.

[SEAL.]

F. A. TENNANT,
Acting Commissioner of Patents.

operable through the steering mechanism to actuate the screw to change the relative positions of the rock shaft sections.

14. The combination with a base having steering wheels, of hollow longitudinal reaches forming a part of said base, a body, connections between the reaches and the body, rock shafts within the reaches, connections between the rock shafts and the wheels, a transverse sectional rock shaft carried by the base and connected to the body, upstanding projections carried by the adjacent ends of the rock shaft sections and having threaded openings, a screw in said threaded openings, and means for actuating the rock shafts and for synchronously actuating the screw.

15. The combination with a base having steering wheels, of hollow rockable reaches forming part of said base, a cushioning mechanism connected to said reaches, a body, connections between the reaches and the body, rock shafts within the reaches, connections between the rock shafts and the wheels, a transverse sectional rock shaft carried by the base and connected to the body, upstanding projections carried by the adjacent ends of the rock shaft sections and having threaded openings, a screw in said threaded openings, and means for actuating the rock shafts and for synchronously actuating the screw.

16. The combination with horizontal axles, of means for maintaining said axles in horizontal planes at all times, wheels on said axles, a body supported by the axles, and means for deflecting the wheels to turn the vehicle and for tilting the body with respect to said axles.

17. The combination with axles, of wheels connected to said axles, a tilting body supported by said axles, and means for deflecting the wheels in horizontal planes only and for tilting the body.

18. The combination with a body and axles, of wheels on said axles at all times vertical but adapted to be deflected out of a straight path, a steering gear for deflecting all said wheels, and means actuated by the steering gear for tilting the body in proportion to the deflection of the wheels.

In testimony whereof, I hereunto affix my signature, in the presence of two witnesses.

CHARLES F. SCHMELZ.

Witnesses:
B. F. FUNK,
H. W. TUTTLE.

---

It is hereby certified that in Letters Patent No. 932,333, granted August 24, 1909, upon the application of Charles F. Schmelz, of Bristol, Connecticut, for an improvement in "Vehicles," an error appears in the printed specification requiring correction, as follows: In line 103, page 3, the word "by" should be stricken out; and that the said Letters Patent should be read with this correction therein that the same may conform to the record of the case in the Patent Office.

Signed and sealed this 14th day of September, A. D., 1909.

[SEAL.]

F. A. TENNANT,
Acting Commissioner of Patents.

Correction in Letters Patent No. 932,333.

It is hereby certified that in Letters Patent No. 932,333, granted August 24, 1909, upon the application of Charles F. Schmelz, of Bristol, Connecticut, for an improvement in "Vehicles," an error appears in the printed specification requiring correction, as follows: In line 103, page 3, the word "by" should be stricken out; and that the said Letters Patent should be read with this correction therein that the same may conform to the record of the case in the Patent Office.

Signed and sealed this 14th day of September, A. D., 1909.

[SEAL.]

F. A. TENNANT,
*Acting Commissioner of Patents.*